Figure 1:
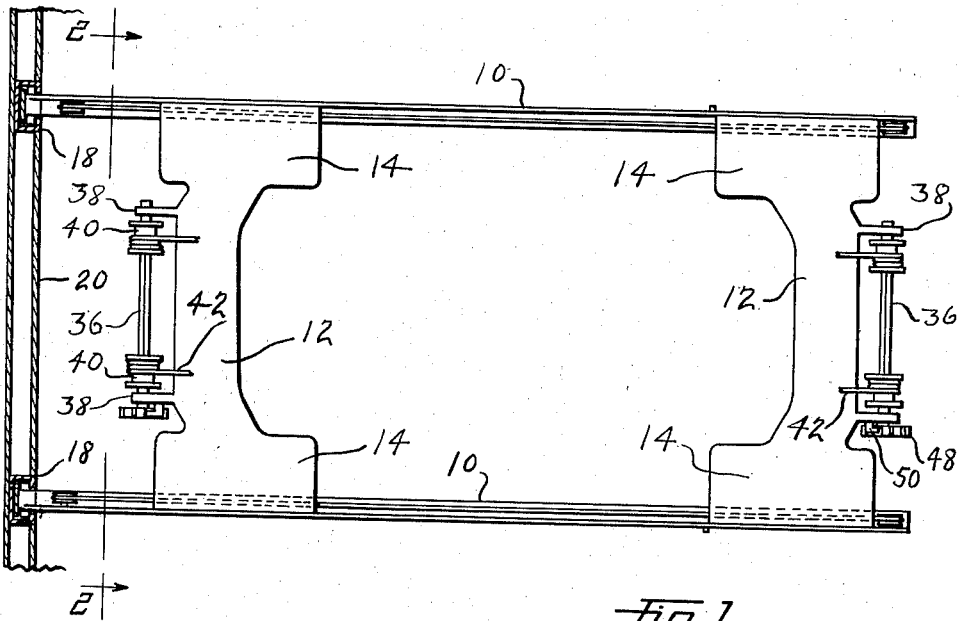

June 11, 1940.　　　　L. H. COOPER ET AL　　　　2,204,034
AUTOMOBILE LOADING FRAME
Filed March 9, 1938　　　　2 Sheets-Sheet 1

INVENTORS
LAWSON H. COOPER and WILLIAM J. NIGHTINGALE
BY
ATTORNEYS

June 11, 1940.   L. H. COOPER ET AL   2,204,034
AUTOMOBILE LOADING FRAME
Filed March 9, 1938   2 Sheets-Sheet 2

INVENTORS
LAWSON H. COOPER and WILLIAM J. NIGHTINGALE
BY Parker & Burton
ATTORNEYS Patented June 11, 1940

2,204,034

UNITED STATES PATENT OFFICE 2,204,034

AUTOMOBILE LOADING FRAME

Lawson H. Cooper and William J. Nightingale, Flint, Mich., assignors, by mesne assignments, to H. J. Forster, trustee for the Association of American Railroads Application March 9, 1938, Serial No. 194,892

1 Claim. (Cl. 105—368)

This invention relates to automobile loading frames and particularly to the construction of such frames especially adaptable for use in loading automobiles in railway freight cars and other types of transporting conveyances.

The ordinary railway freight car is less in height than the combined height of two automobiles and has a length which is only slightly greater than the combined length of two automobiles of customary design. In this restricted space attempts have been made to ship three or more automobiles. In order to crowd more than two automobiles into the freight car, one, or sometimes two of these automobiles if they were of small wheel base, have been loaded in raised inclined position in the freight car and two other automobiles loaded upon the floor and advanced as far as possible under the raised automobiles.

Decking devices or loading frames were provided for raising and inclining certain of the automobiles in the freight car. These frames were of such a construction that certain projecting parts thereon interfered with the complete advance of the floor loaded automobiles thereunder. In many cases these obstructions prevented the loading of four automobiles for each freight car, and this is particularly true of shipments which included automobiles of relatively long wheel base.

It is an important object of this invention to provide a decking frame for loading automobiles in a freight car or other form of transporting conveyance which enables the automobiles to be more compactly loaded in the freight car so that four automobiles of any type or length can be loaded without difficulty.

Another object of this invention is to increase the clearances both under the decking frame and in the center thereof which, when the frame is raised and inclined, will allow a floor of loaded automobiles to be advanced further under the decking frame than heretofore possible. The further the floor loaded automobiles in a freight car are advanced under the decking frame, the longer the type of automobiles that may be loaded and the easier it is to perform the loading operation.

Another important object of this invention is to provide a novel decking frame constructed of relatively light parts, yet forming a strong sturdy deck for supporting an automobile in raised inclined position. The parts of the decking frame are relatively few in number and economically constructed and assembled. The cross members of the frame are especially shaped for providing clearance both under the frame and in the center thereof. The cross members are formed of a single piece of metallic material integrally joined together and deformed into the desired formation. They connect the longitudinal or side members of the frame at substantially the positions where the four road wheels of an automobile are supported upon the frame. As a result the juncture of these parts forms an excellent support upon which the road wheels of the automobile may rest. As will be more particularly described hereinafter the cross members of the decking frame have an upwardly bowed or arched central portion to increase the clearance under the frame. These cross members are also shaped so that the central opening in the frame is extended longitudinally outwardly beyond the inner edges of the wheel supporting sections on the frame.

Figure 2:
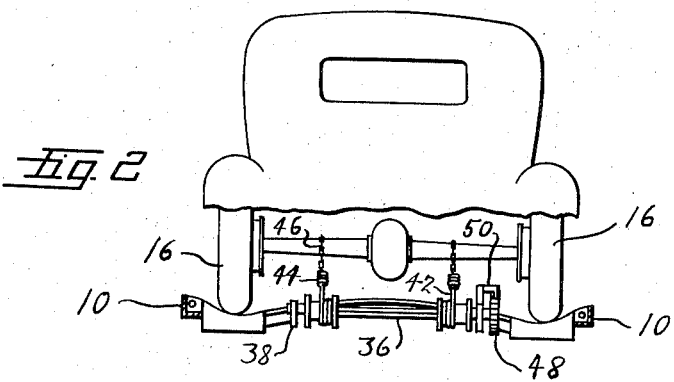
Figure 4:
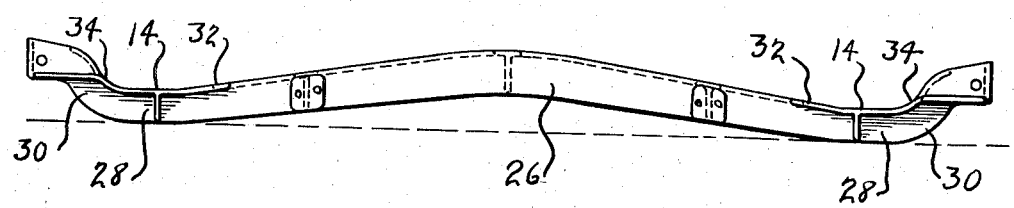
Figure 3:
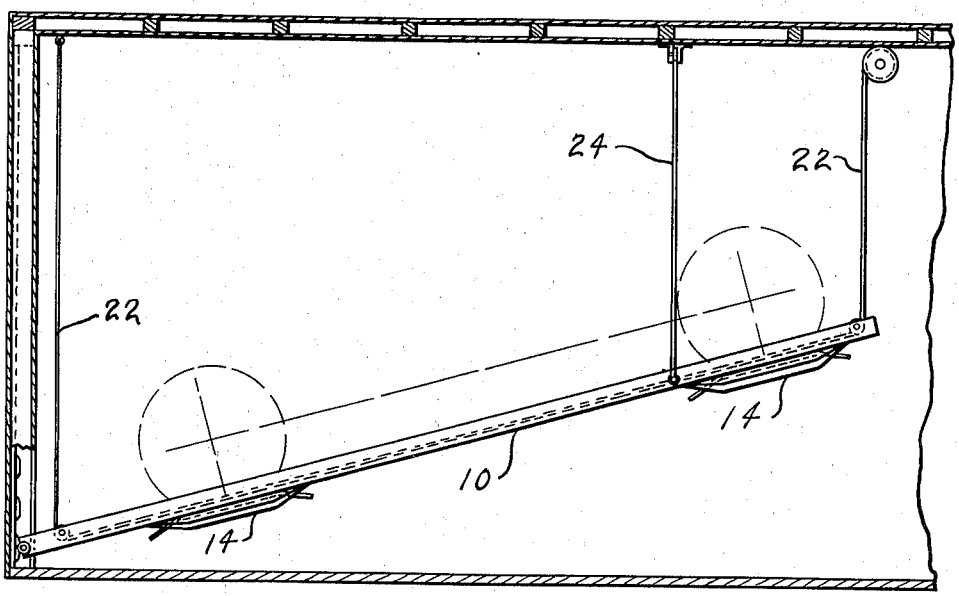
Figure 5:
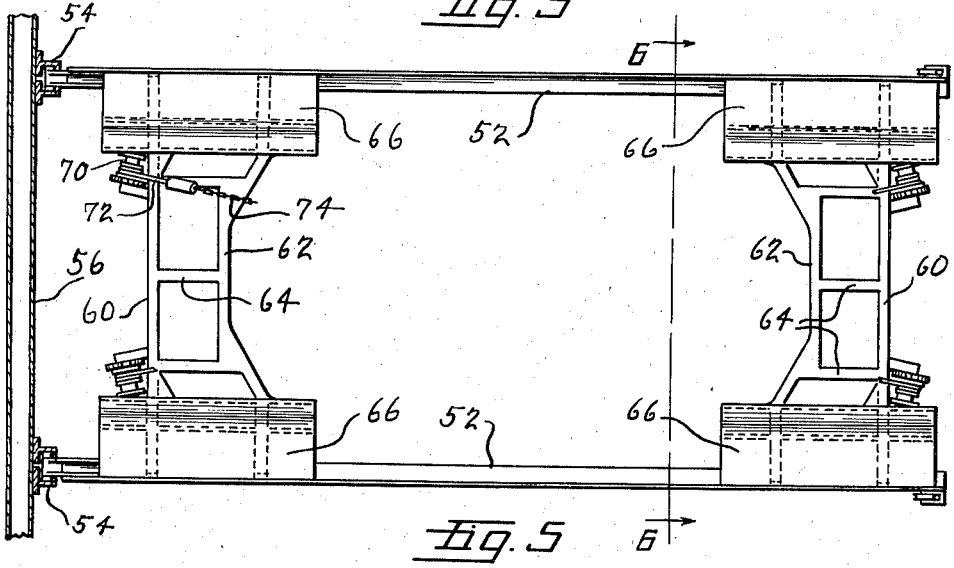
Figure 6:
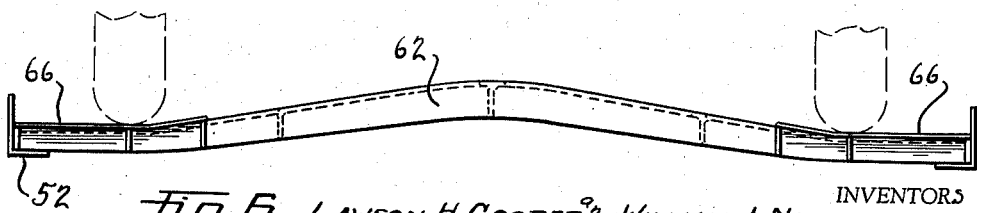

Various other objects, advantages, and meritorious features will become more fully apparent from the following description, appended claim, and accompanying drawings, wherein:

Figure 1 is a plan view of a decking frame embodying the invention and showing the manner of slidably attaching the frame to the end wall of a freight car, Fig. 2 is a cross-sectional view taken along line 2—2 of Fig. 1 and illustrating an automobile mounted upon the frame, Fig. 3 is an elevation of the embodiment showing Fig. 1 illustrating the manner of supporting the decking frame in raised inclined position in a railway freight car, Fig. 4 is an enlarged detail view showing the construction of a cross member employed in the embodiment of the invention in Fig. 1, Fig. 5 is a plan view of a modification of the invention, and Fig. 6 is an enlarged detailed view taken along line 6—6 of Fig. 5 showing the construction of the cross members.

Referring in detail to the embodiments shown in Figs. 1, 2, 3 and 4, the decking frames proper comprise two spaced parallel longitudinal members 10—10 having lengths at least equal to that of the automobile to be supported thereon. These longitudinal or side members are connected together by cross members 12—12 attached to the side members at substantially the places where the four road wheels of an automobile would bear when properly loaded upon the frame. Each cross member 12—12 carries upon its opposite ends tread plates 14 upon which the road wheels 16 of an automobile rest. One end of each side member 10 is slidable in a vertical guide 18 in a wall such as the end wall 20 of a railway freight car. A cable system such as 22 may be provided for raising and lowering the entire decking frame and for pivoting the same about its connection to the end wall 20. When raised and inclined the free end of the decking frame may be suspended from the ceiling of the freight car as by rods 24 in Fig. 3.

As shown in the detailed view in Fig. 4 each cross member 12 has an upwardly arched or bowed central portion 26. The opposite ends of the cross members have a straight portion 28 and are then turned upwardly at their extremities 30 for securement to the longitudinal members 10—10. As shown in Fig. 1 the tread plates may narrow and then extend completely over the top of the cross members. By narrowing the width of the plates over the top of the cross members, particularly along the inside edges thereof, the central opening in the frame is increased longitudinally as shown in the plan view of Fig. 1.

The tread plates 14 upon which the road wheels bear conform to the curvature of the cross members as illustrated in the detailed view in Fig. 4. As shown in this figure the inner side edges of the wheel plates 14 overlap upon the upwardly bowed portions at 32. The outer side edges of the wheel plates turn upwardly at 34 to follow the upwardly bent extremities 30 of the cross members. The resulting forms of the tread plates is that shown in Fig. 2 wherein the plates have a channeled formation for receiving the road wheels 16 of the automobile. The upwardly turned character of the tread plates on opposite sides of the road wheels assist in restraining these wheels from lateral travel on the decking frame.

In order to hold the motor vehicle down upon the decking frame, tensioning devices secured to the cross members are provided with flexible tensioning elements capable of attachment to the under part of the motor vehicle for lashing the same down upon the frame. These devices are preferably secured to the upwardly arched sections of the cross members and upon their outside edges to facilitate the loading operation. As shown, each cross member carries at least one hold down device of this character.

In particular, the hold down devices for each end of the automobile comprises a shaft 36 secured at its opposite ends to the arched central portion of the cross members by brackets 38. The shaft supports a pair of spaced winding drums 40 each carrying a flexible tensioning element such as a cable 42, coiled spring 44, and a chain 46 which is capable of being looped around the axle or other under part of the automobile. The shaft is squared between the drums so that it may be rotated by a suitable wrench. A ratchet wheel 48 secured to the shaft is acted upon by a pawl 50 to prevent return rotation after the drums and the flexible elements carried thereby are tensioned.

The loading frame illustrated in Figs. 5 and 6 constitutes another embodiment of the invention. This embodiment, like that previously described, includes longitudinal members 52—52 of L-shaped formation connected together by spaced cross members into an open rectangular frame. One end of each longitudinal member 52 is slidably fitted in vertical channel guides 54 secured to the surface of the end wall 56 of a freight car. A suitable cable system like that previously described or like that shown in the copending application of William J. Nightingale, Serial No. 758,378, filed December 20, 1934, may be used for raising and inclining the decking frame.

The cross or transversely extending members of the modification in Figs. 5 and 6 each consists of two members, outer member 60 and inner member 62, integrally joined together by short connecting members such as 64. The opposite ends of the cross members as shown in the detailed view in Fig. 6 seat in the L-shaped formation of the side members and they may be welded thereto. As in the previously described embodiment of the invention, the places where the longitudinal members and cross members joined are used as supports upon which wheel plates 66 are fixed. These wheel plates extend longitudinally parallel to the side members 52 and each rest on the ends of the two cross members 60 and 62.

The cross members as in the previous modification are bowed in their central portions to increase the clearance under the frame. As shown in Fig. 6 the inner side margin of the wheel plate 66 overlies upon the arched portion of each cross member and inclines upwardly therewith. This aids in guiding the wheels of the automobile upon the frame and restrains the same from lateral movement while in shipment.

As shown in the plan view in Fig. 5 the members 62 of the cross frame construction are bowed or deformed outwardly of the frame as well as upwardly so as to extend the central opening of the frame as far as possible between the wheel supporting plates 66.

Secured to the outer cross frame member 60 are tensioning devices adapted to hold the automobile down upon the frame. Each tensioning device may comprise, as shown, a winding drum 70 secured to the cross member 60 for rotation about an oblique axis. A cable 72 wound around each drum carries on its free end a chain 74 which, as in the previously described embodiment, is capable of being looped about an underpart of the automobile loaded on the frame.

To perform the loading operations with the decking frames described herein, the frames are first lowered to substantially horizontal position on the floor of the freight car. An automobile is then backed upon each decking frame so that the end of the automobile is adjacent the end wall of the freight car. Upon shortening the cable system of each decking frame the automobile is raised. After a predetermined movement, the decking frame is pivotally secured to its guide on the end wall of the freight car. Further shortening movement of the cable system of each frame will cause the free end of the frame to rise above its pivoted end and assume an inclined position such as that shown in Fig. 3.

The floor loaded automobiles are then driven forwardly under the raised inclined decking frames. The front of each automobile is advanced as far towards the end wall as possible. As these automobiles are advanced under the decking frames the top portion of the radiator of each automobile begins to project into the large central opening in the frame. The construction of the decking frame, particularly the cross members, described hereinabove, cooperates with the floor loaded automobiles so that the latter may be advanced as far as possible under the decking frame.

The upwardly bowed or arched central portion of the cross members enables the floor loaded automobiles to be advanced several more inches under the decking frame. The several inches which are gained by this construction are important because the success or failure of loading four automobiles in a freight car depends largely upon this factor. The arched formation of the cross member at the outer or free end of the decking frame is particularly important. It enables the top of the floor loaded automobiles to move under and past this cross member. Heretofore depending obstacles at this point have prevented further advance of an automobile under the decking frame. The increase in the length of the opening in the frame provided by the construction of the cross members, enables the front radiator section of the floor loaded automobile to be advanced nearer to the end wall of the freight car.

What is claimed:

An automobile loading frame including spaced longitudinal members, means including a transverse member connecting said longitudinal members, said member having opposite end portions which are turned upwardly at their outer extremities and an upwardly bowed central portion connecting the opposite end portions, and wheel supporting plates on the end portions of said transverse member overlapping upon the turned up extremities of the transverse member and upon the bowed central portion thereof and conforming thereto so that the wheel plates have a dished formation transversely of the frame.

LAWSON H. COOPER.
WILLIAM J. NIGHTINGALE.